United States Patent [19]

Yada

[11] Patent Number: 5,035,459
[45] Date of Patent: Jul. 30, 1991

[54] MOLDING UNIT FOR USE WITH AN AUTOMOBILE

[75] Inventor: Yukihiko Yada, Obu, Japan

[73] Assignee: Tokai Kogyo Kabushiki Kaisha, Obu, Japan

[21] Appl. No.: 630,199

[22] Filed: Dec. 19, 1990

[30] Foreign Application Priority Data

Dec. 25, 1989 [JP] Japan .............................. 1-149120[U]
Dec. 25, 1989 [JP] Japan .................. 1-149121

[51] Int. Cl.⁵ ............................................ B60J 10/02
[52] U.S. Cl. ..................................................... 296/93
[58] Field of Search ......................................... 296/93

[56] References Cited

U.S. PATENT DOCUMENTS 4,840,001 6/1989 Kimisawa .......................... 296/93 X
4,950,019 8/1990 Gross ..................................... 296/93

FOREIGN PATENT DOCUMENTS 8018 1/1988 Japan ..................................... 296/93
11416 1/1988 Japan ..................................... 296/93
63-32915 3/1988 Japan .
63-32916 3/1988 Japan .

Primary Examiner—Margaret A. Focarino
Assistant Examiner—Gary C. Hoge
Attorney, Agent, or Firm—Dennison, Meserole, Pollack & Scheiner

[57] ABSTRACT

A molding unit mainly includes a molding body which has a covering portion, and a complemental covering member which is positioned longitudinary along the molding body and which has a complemental covering portion. When the molding body with the complemental covering member is positioned along a window shield of an automobile, the outside surface of the window shield is seated by the covering portion of the molding body at one portion thereof and is seated by the complemental covering portion of the complemental covering member at the other portion thereof.

10 Claims, 15 Drawing Sheets

MOLDING UNIT FOR USE WITH AN AUTOMOBILE

BACKGROUND OF THE INVENTION

The present invention relates to a molding unit for use with an automobile, and more particularly, the invention relates to a molding unit which can perfectly seal a clearance between the window shield and the body and which can be used even when the gap height between the outside surface of the window shield and the outside surface of the body is not uniform throughout the overall circumferential length of the window shield.

The conventional molding unit for use with an automobile generally comprises a strip formed of rubber or synthetic resin adapted to be positioned on the circumferential edge of the window shield and adapted to be mounted on the body by an adhesive or a double-sided tape, and a molding body adapted to be inserted in a clearance between the circumferential edge of the window shield and the body and adapted to be engaged with the strip so as to be fixedly connected to the body.

Such a conventional molding unit is found, for example, in Japanese Laid-Open Utility Model Publication Nos. 63-32915 and 63-32916. Japanese Publication No. 63-32915 discloses a molding body having a weir portion to downwardly lead rainwater which is formed by partly cutting off the molding body. Japanese Publication No. 63-32916 discloses a molding body having a weir member to downwardly lead rainwater which is longitudinarily bonded to the molding body.

A problem usually associated with the molding unit in the prior art as described in Japanese Publication No. 63-32915 is that the cutting operation of the molding body causes burrs on the molding body. This may lead to undesirable awkward appearance.

Another problem usually associated with the molding unit in the prior art as described in Japanese Publication No. 63-32916 is that the weir member is independently formed and is bonded to the molding body. This may also lead to undesirable awkward appearance.

A further problem usually associated with the molding unit in the prior art as described in Japanese Publications Nos. 63-32915 and 63-32916 is that such a molding unit is not adaptable when the gap height between the outside surface of the window shield and the outside surface of the body is not uniform throughout the overall circumferential length of the window shield.

SUMMARY OF THE INVENTION

It is an object of the invention to provide an improved molding unit for use with an automobile, that is, to provide a molding unit which is applicable even when the gap height between the outside surface of the window shield and the outside surface of the body is not uniform throughout the overall circumferential length of the window shield.

It is another object of the invention to provide a molding unit for use with an automobile, that is, to provide a molding unit in which the problem associated with the conventional molding unit is eliminated.

A molding unit of the present invention includes a molding body, a complemental covering member positioned longitudinarily along the molding body, and a plurality of fasteners provided on the automobile body for fastening the molding body with the complemental covering member to the automobile body. The molding body has a leg portion, a lip portion which is provided on the side surface of the leg portion to form a groove between the leg portion and the lip portion, and a covering portion provided on the upper portion of the leg portion. The complemental covering member has a complemental covering portion and a fitting portion which is to be fitted to the groove between the leg portion and the lip portion. When the molding body with the complemental covering member is positioned along the window shield, the outside surface of the window shield is seated by the covering portion of the molding body at one portion thereof and is seated by said complemental covering portion of the complemental covering member at the other portion thereof.

An important feature of the present invention is that the molding unit is adaptable even when the gap height between the outside surface of the window shield and the outside surface of the body is not uniform throughout the overall circumferential length of the window shield.

Another feature of the present invention is that the molding body exhibits a good appearance.

The present invention will become more fully apparent from the claims and the description as it proceeds in connection with the drawings.

BRIEF DESCRIPTION OF THE DRAWINGS

FIG. 3b is an elevational view of FIG. 3a;

FIG. 3c is an end view of FIG. 3a;

FIG. 5a is a sectional view taken along the line V—V of FIG. 4a;

FIG. 6a is a sectional view taken along the line VI—VI of FIG. 4a;

FIG. 7a is a sectional view taken along the line VII—VII of FIG. 4a;

FIG. 9b is an elevational view of FIG. 9a;

FIG. 9c is an end view of FIG. 9a;

FIG. 10a is a view similar to FIG. 4a;

FIG. 11a is a sectional view taken along the line XI—XI of FIG. 10a;

FIG. 12a is a sectional view taken along the line XII—XII of FIG. 10a;

FIG. 13a is a sectional view taken along the line XIII—XIII of FIG. 10a;

DETAILED DESCRIPTION OF THE PREFERRED EMBODIMENT

Figure 1:
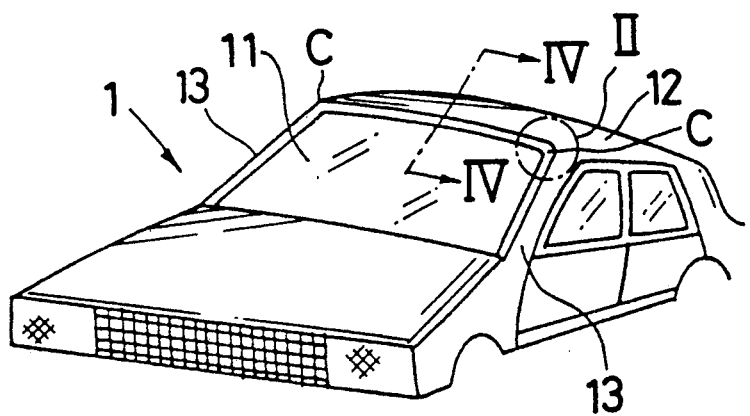
FIG. 1 is a schematic illustration of an automobile showing several portions mounted with a molding unit according to a first embodiment of the present invention.

Referring to FIG. 1, a front window shield 11 is provided on a body 1 of an automobile. The window shield 11 is effectively supported on a roof panel 12 of the body 1 and on front pillars 13 integrally formed with the roof panel 12.

Referring now to FIGS. 2a to 7b, shown therein is a molding unit according to a first embodiment of the invention.

Figure 2A:
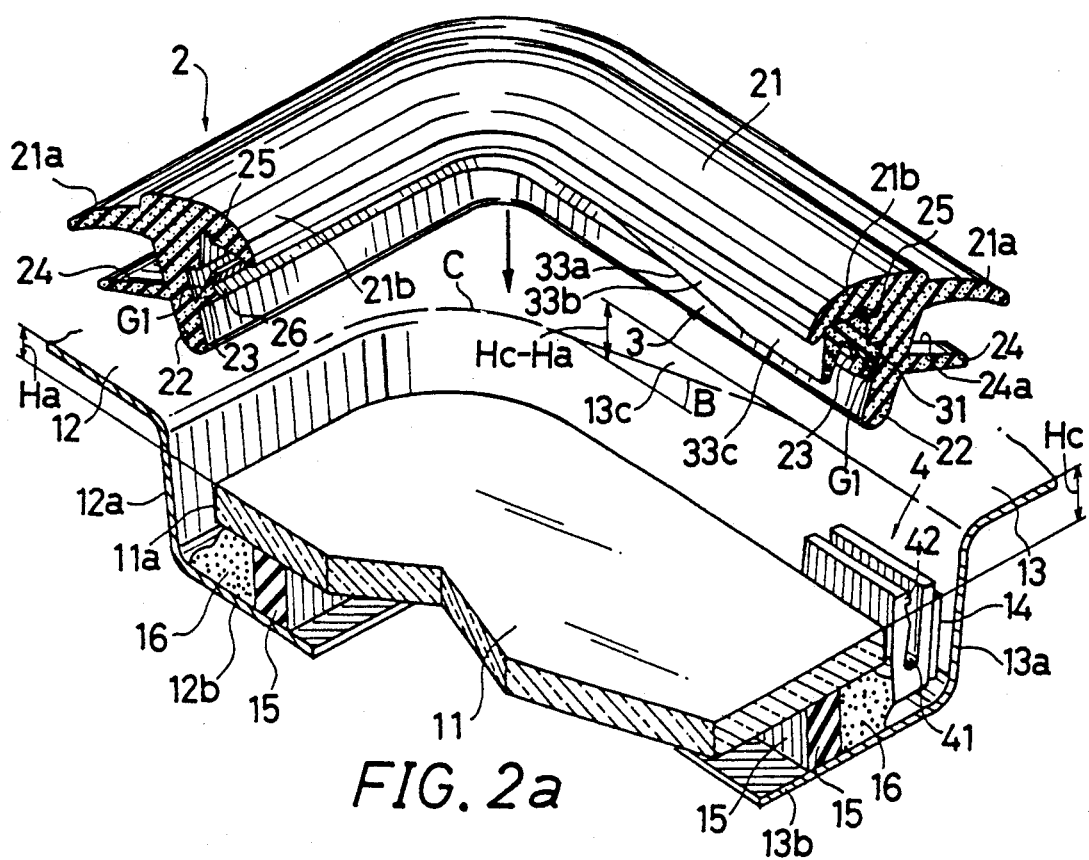
FIG. 2a is a perspective view of a portion shown by phantom line II of FIG. 1, before installing a molding body to which a complemental covering member is fitted.
Figure 2B:
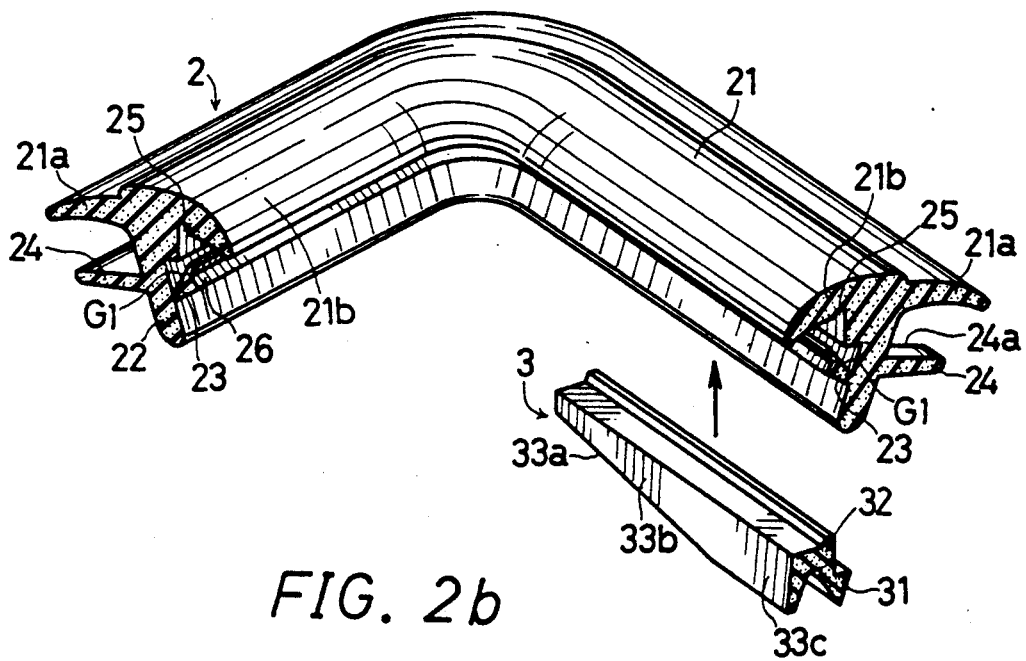
FIG. 2b is a perspective view of the molding body and the complemental covering member.

As shown in FIG. 2a and 2b, the roof panel 12 and the front pillars 13 are interconnected to form arcuate portions C therebetween. The peripheral edge of the roof panel 12 is inwardly folded to form a slanted wall portion 12a and a flanged portion 12b. The peripheral edge of each front pillar 13 is also inwardly folded to form a slanted wall portion 13a and a flanged portion 13b which are integral with the wall portion 12a and the flanged portion 12b, respectively.

As will be appreciated, the gap height Ha between the outside surface of the window shield 11 and the outside surface of the roof panel 12 is smaller than the gap height Hc between the outside surface of the window shield 11 and the outside surfaces of the front pillars 13. In other words, the height of the wall portion 12a is lower than that of the wall portions 13a. Therefore, each of the front pillars 13 is formed with an inclined portion 13c to which the roof panel 12 is connected.

The window shield 11 is circumferentially provided with a dam member 15 formed of a rubber or the like and is bonded to the flanged portions 12b, 13b with an adhesive 16.

The wall portion 13a of each front pillar 13 is provided with a plurality of fasteners 4, at suitable intervals, with double-sided tape 14. Each of the fasteners 4 is formed of resilient material such as rubber and synthetic resin. The fastener 4 has a groove 41 extending throughout the overall length thereof, that is, it has a substantially U-shaped cross-sectional configuration. The fastener 4 is provided longitudinary with a projection 42 projecting into the groove 41 and extending throughout the overall length thereof. The fasteners 4 are positioned so that the projections 42 oppose to the wall portions 13a of the front pillars 13.

A molding body 2 is formed of resilient material such as rubber and synthetic resin and is configured so as to substantially conform to the configuration of the window shield 11.

Figure 5A:
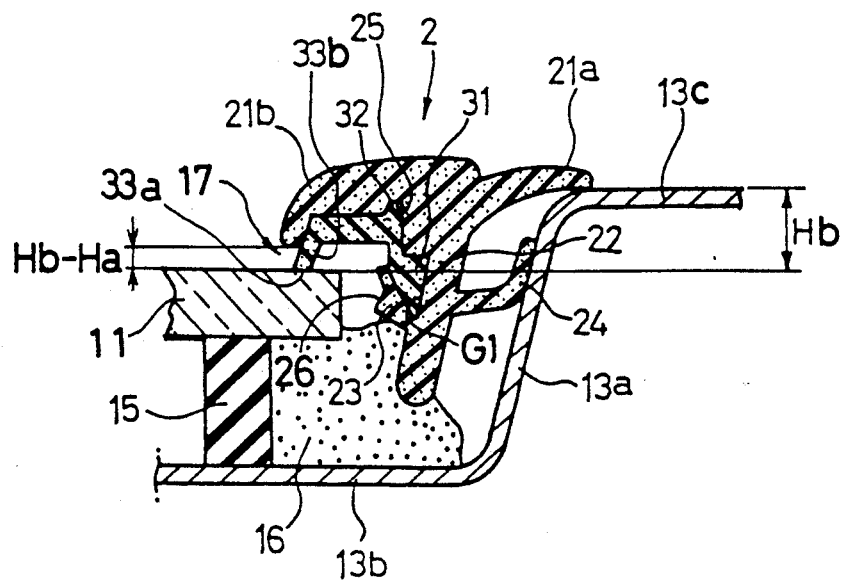
Figure 5B:
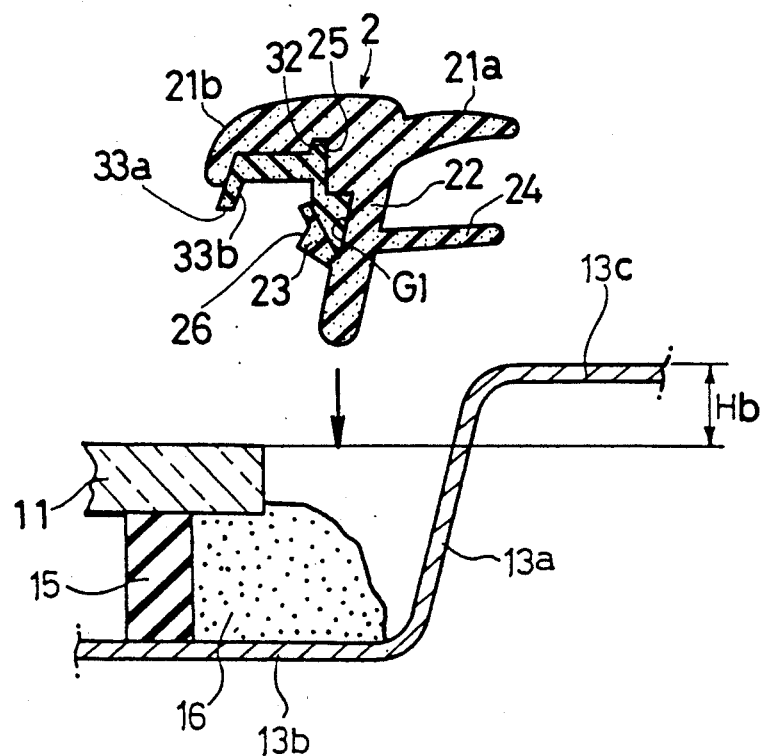
FIG. 5b is a view similar to FIG. 5a, before installing the molding body to which the complemental covering member is fitted.

The molding body 2 mainly comprises a leg portion 22 which is inserted into the clearance between the wall portions 12a, 13a and an edge surface 11a of the window shield 11, and a covering portion 21 which is integrally formed with the leg portion 22 and which is sized to sufficiently cover the clearance between the wall portion 12a, 13a and the edge surface 11a. The covering portion 21 includes an outer covering portion 21a to cover the edge portions of the roof panel 12 and the front pillars 13 and an inner covering portion 21b to cover the edge portion of the window shield 11. The leg portion 22 is integrally provided with an outwardly extended resilient lip 24. The resilient lip 24 is formed with cut off portions 24a which are adapted to correspond to the fasteners 4 provided on the wall portions 13a when the molding body 2 is installed in the clearance between the wall portions 12a, 13a and the edge surface 11a of the window shield 11. The lower surface of the inner covering portion 21b is formed with an engagement groove 25 adjacent to the leg portion 22. The leg portion 22 is integrally provided with a complemental lip 23 which is upwardly inclined to form a V-shaped groove G1 between the complemental lip 23 and the inner surface of the leg portion 22. The V-shaped groove G1 is best shown in FIGS. 5a and 5b. The complemental lip 23 is formed with a shoulder portion 26 which is engageable with the lower edge of the window shield 11 at a portion adjacent to the roof panel 12.

The lower surface of the inner covering portion 21b is provided with complemental covering members 3 which are positioned only along the front pillars 13 and which extend substantially throughout the overall length of the front pillars 13.

As shown in FIGS. 3a, 3b, 3c, 5b, 6b and 7b, the complemental covering member 3 has a substantially channel shaped configuration and is formed of resilient material such as rubber and synthetic resin. The complemental covering member 3 includes a complemental covering portion 33, a longitudinally projected portion 32 which is engageable with the engagement groove 25, and a fitting portion 31 which is to be fitted into the V-shaped groove G. The fitting portion 31 is formed with cut off portions 34 which are adapted to correspond to the fasteners 4 provided on the wall portions 13a when the molding body 2 is installed in the clearance between the wall portions 12a, 13a and the edge surface 11a of the window shield 11. The complemental covering portion 33 is formed with an inclined surface 33a at one end portion opposite to the arcuate portion C between the roof panel 12 and the front pillar 13, thereby to be formed with a reduced height portion 33b having a triangular configuration. As will be appreciated, the length of the inclined surface 33a is substantially equal to that of the inclined portion 13c of the front pillar 13, and the inclination angle A1 of the inclined surface 33a is substantially identical with the inclination angle B of the inclined portion 13c. Further, the other portion of the complemental covering portion 33 will hereinafter be referred to as a full height portion 33c.

Figure 3A:
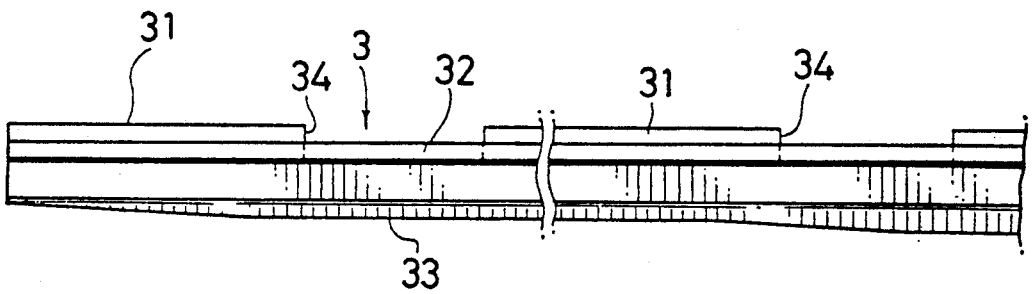
FIG. 3a is a plan view of the complemental covering member.
Figure 3B:
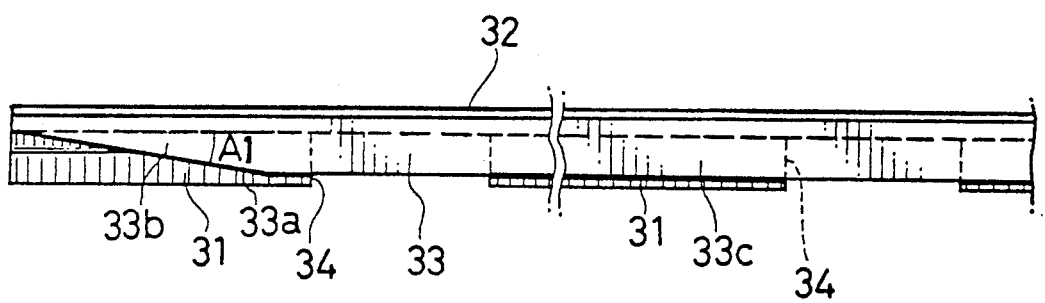
Figure 3C:
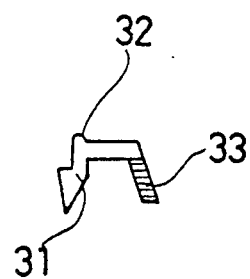
Figure 3D:
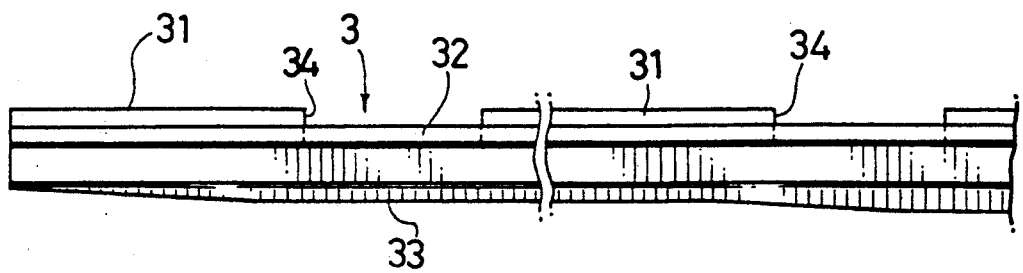
FIG. 3d is a plan view of a modified complemental covering member.
Figure 3E:
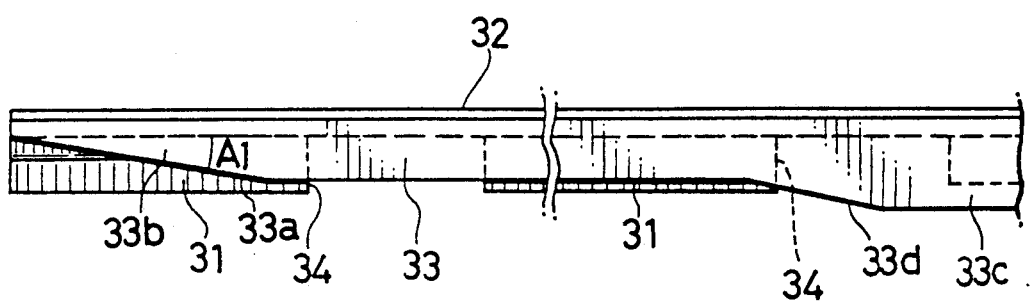
FIG. 3e is an elevational view of FIG. 3d.
Figure 3F:
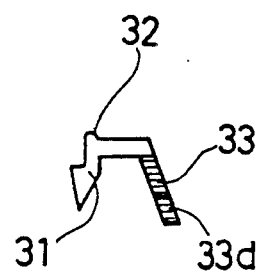
FIG. 3f is an end view of FIG. 3d.

As will be understood, the configuration of the reduced height portion 33b can be modified to conform to a modified configuration of the inclined portion 13c of the front pillar 13. Also, as shown in FIGS. 3d, 3e and 3f, a second inclined surface 33d can be formed on the complemental covering portion 33 when the front pillar 13 includes a second inclined portion (not shown).

As shown in FIG. 2b, the complemental covering member 3 as formed above is incorporated to the molding body 2 by fitting the fitting portion 31 and the projected portion 32 thereof into the V-shaped groove G1 and the engagement groove 25 of the molding body 2. As will be appreciated, the complemental covering member 3 is positioned in such a way that the reduced height portion 33b of the complemental covering portion 33 corresponds to the inclined portion 13c of the front pillar 13.

As shown in FIG. 2a, the molding body 2 with the complemental covering member 3 is installed to the body 1 by inserting the leg portion 22 of the molding body 2 into the clearance between the edge surface 11a of the window shield 11 and the wall portion 12a of the roof panel 12.

Figure 4A:
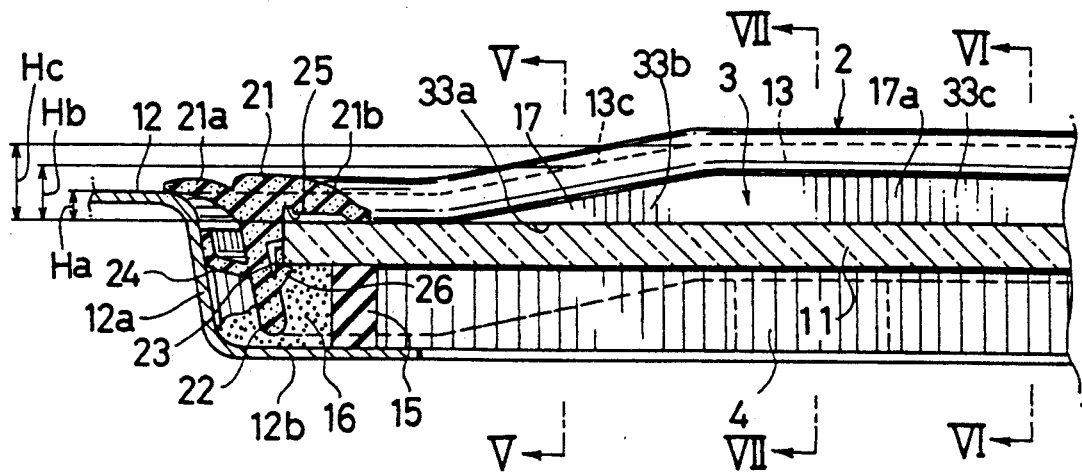
FIG. 4a is a sectional view taken along the line IV—IV of FIG. 1.
Figure 4B:
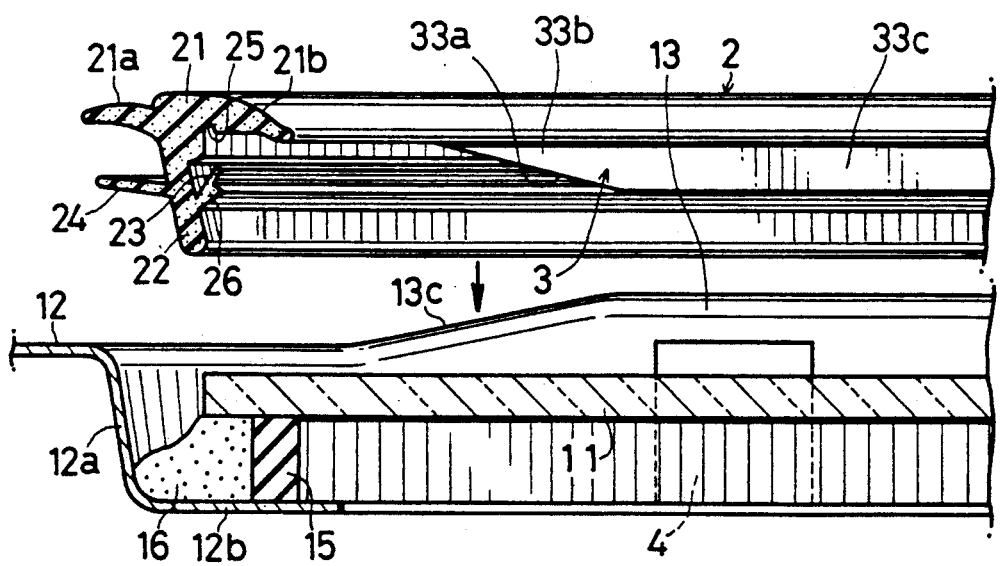
FIG. 4b is a view similar to FIG. 4a, before installing the molding body to which the complemental covering member is fitted.

As shown in FIGS. 4a and 4b, when the leg portion 22 is completely inserted into the space, at a portion of the molding body 2 adjacent to the roof panel 12, the outer covering portion 21a and the inner covering portion 21b are closely seated on the outside surface of the roof panel 12 and the outside surface of the window shield 11, respectively. The resilient lip 24 is pressed against the wall portion 12a. The shoulder portion 26 of the complemental lip 23 is engaged with the lower edge of the window shield 11. Also, the lower portion of the leg portion 22 is bonded to the flanged portion 12b with the adhesive 16.

As shown in FIG. 5a and 5b, at a portion of the molding body 2 corresponding to the inclined portion 13c of the front pillar 13, the outer covering portion 21a is closely seated on the outside surface of the front pillar 13. The resilient lip 24 is pressed against the wall portion 13a. At this portion, since the gap height Hb between the outside surface of the window shield 11 and the outside surface of the front pillar 13 is greater than the gap height Ha between the outside surface of the window shield 11 and the outside surface of the roof panel 12, the inner covering portion 21b can not contact the outside surface of the window shield 11, thereby providing a clearance 17 having a width of Hb-Ha therebetween. However, since this portion of the molding body 2 is provided with the reduced height portion 33b of the complemental covering portion 33, the reduced height portion 33b is effectively flexed to be seated on the outside surface of the window shield 11. Also, the lower portion of the leg portion 22 is bonded to the flanged portion 13b with the adhesive 16.

As shown in FIGS. 6a to 7b, at a portion of the molding body 2 corresponding to the front pillar 13 except for the inclined portion 13c, the outer covering portion 21a is closely seated on the outside surface of the front pillar 13. At this portion, since the gap height Hc between the outside surface of the window shield 11 and the outside surface of the front pillar 13 is further greater than the gap height Ha between the outside surface of the window shield 11 and the outside surface of the roof panel 12, the inner covering portion 21b can not contact the outside surface of the window shield 11, thereby providing a clearance 17a having a width of Hc-Ha therebetween. However, since this portion is provided with the full height portion 33c of the complemental covering portion 33, the full height portion 33c is effectively seated on the outside surface of the window shield 11.

Figure 6A:
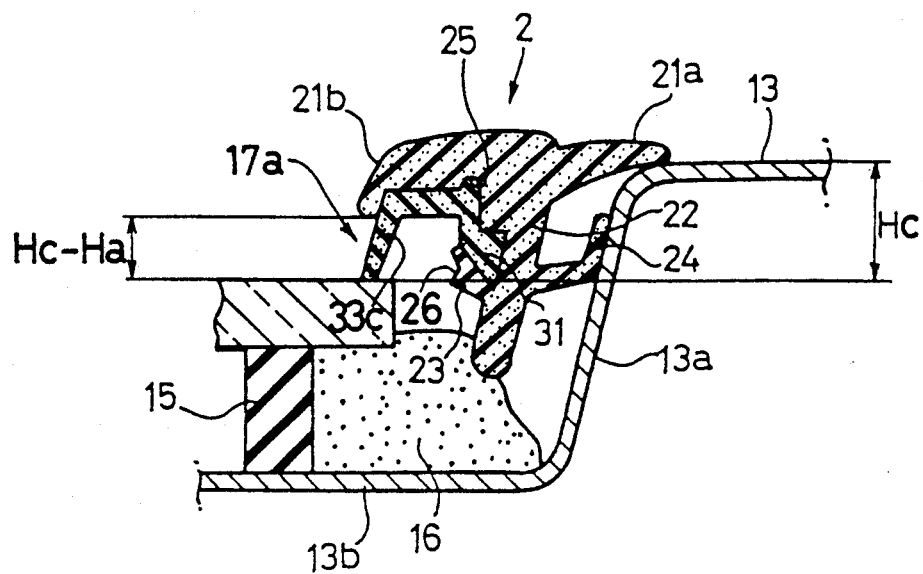
Figure 6B:
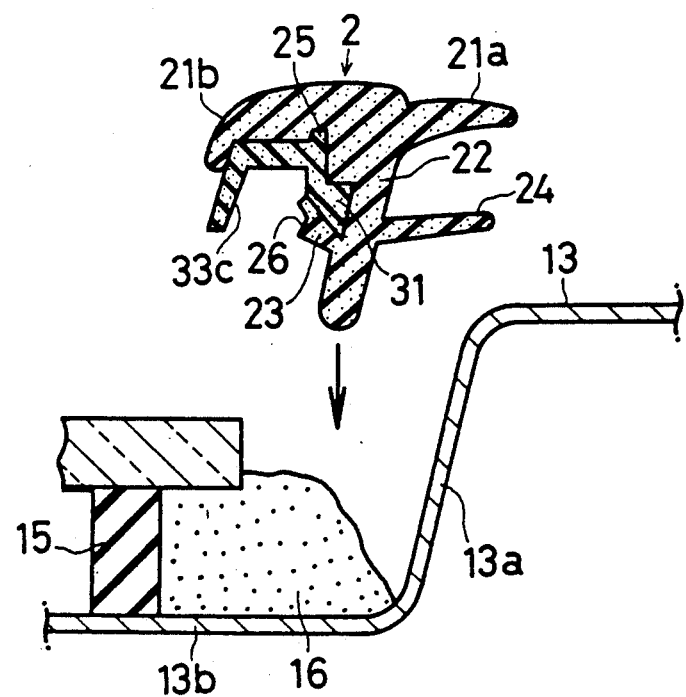
FIG. 6b is a view similar to FIG. 6a, before installing the molding body to which the complemental covering member is fitted.

As shown in FIGS. 6a and 6b, at a portion of the molding body 2 which does not correspond to the fastener 4, the resilient lip 24 is pressed against the wall portion 13a. Also, the lower portion of the leg portion 22 is bonded to the flanged portion 13b with the adhesive 16.

Figure 7A:
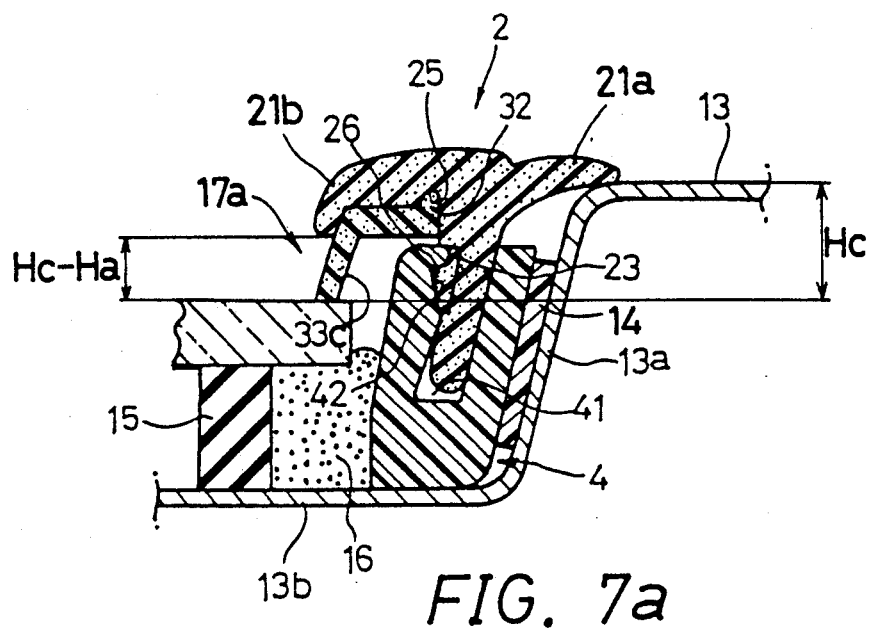
Figure 7B:
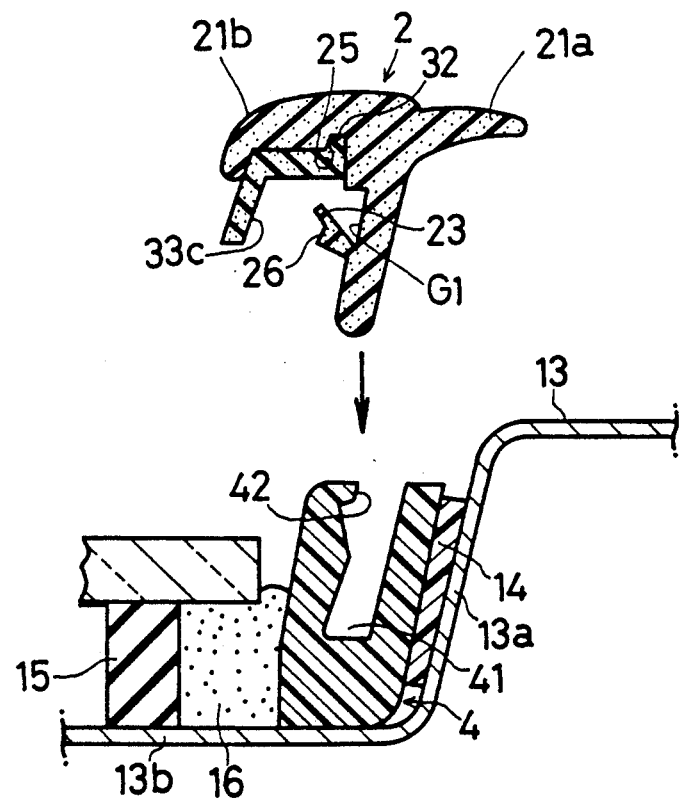
FIG. 7b is a view similar to FIG. 7a, before installing the molding body to which the complemental covering member is fitted.

As shown in FIGS. 7a and 7b, at a portion of the molding body 2 which corresponds to the fastener 4, the lower portion of the leg portion 22 is inserted into the groove 41 of the fastener 4. At this time, the complemental lip 23 is pressed to the leg portion 22 to permit engagement of the projection 42 with the shoulder portion 26 of the complemental lip 23 because the V-shaped groove G1 is not filled with the fitting portion 31 of the complemental covering member 3. Thus the molding body 2 with the complemental covering member 3 is fixedly supported on the body 1.

Referring now to FIGS. 8a to 13b, shown therein is a molding unit according to a second embodiment of the invention. In these drawings, like reference characters refer to the same or similar parts throughout these figures.

Figure 8A:
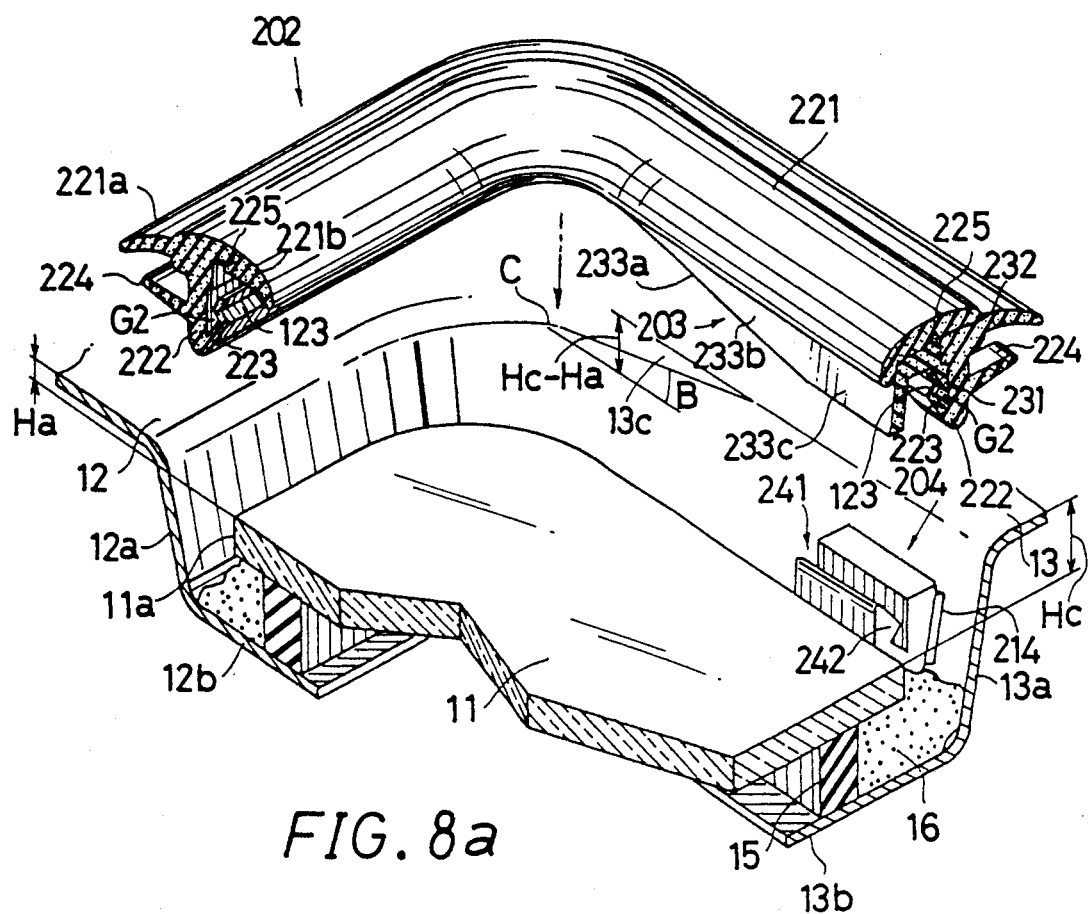
FIG. 8a is a view similar to FIG. 2a, showing a molding unit according to a second embodiment of the present invention.
Figure 8B:
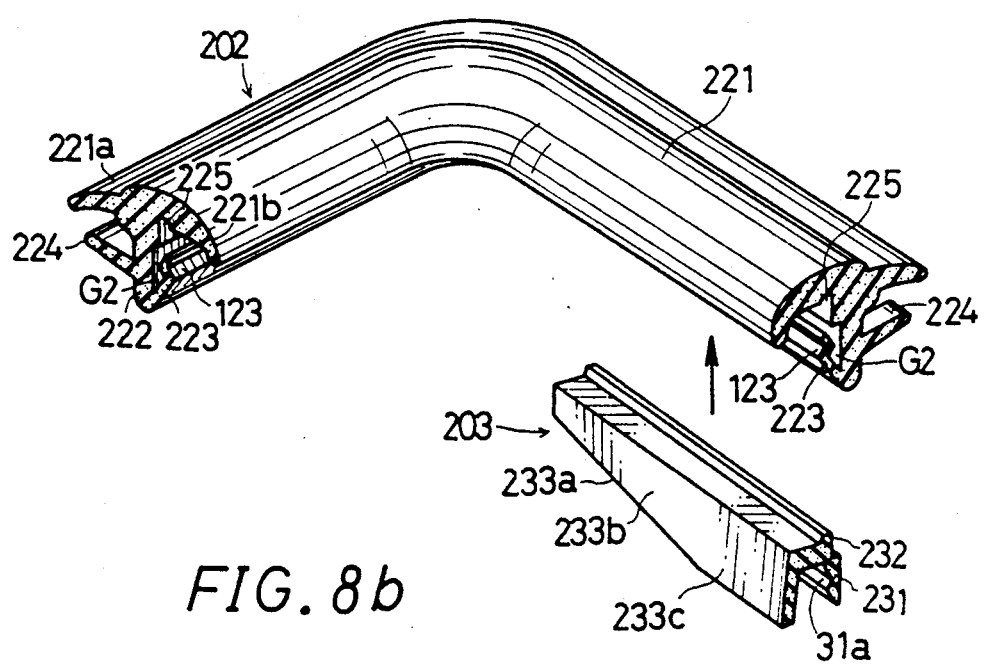
FIG. 8b is a perspective view of the molding body and the complemental covering member.

As shown in FIGS. 8a and 8b, the roof panel 12 and the front pillars 13 are interconnected to form arcuate portions C therebetween. The peripheral edge of the roof panel 12 is inwardly folded to form a slanted wall portion 12a and a flanged portion 12b. The peripheral edge of each front pillar 13 is also inwardly folded to form a slanted wall portions 13a and a flanged portions 13b which are integral with the wall portion 12a and the flanged portion 12b, respectively.

As will be appreciated, the gap height Ha between the outside surface of the window shield 11 and the outside surface of the roof panel 12 is smaller than the gap height Hc between the outside surface of the window shield 11 and the outside surfaces of the front pillars 13. In other words, the height of the wall portion 12a is lower than that of the wall portions 13a. Therefore, each of the front pillars 13 is formed with an inclined portion 13c to which the roof panel 12 is connected.

The window shield 11 is circumferentially provided with a dam member 15 formed of a rubber or the like and is bonded to the flanged portions 12b, 13b with an adhesive 16.

The wall portion 13a of each front pillar 13 is provided with a plurality of fasteners 204, at suitable intervals, with double-sided tape 214. Each of the fasteners 204 is formed of resilient material such as rubber and synthetic resin. The fastener 204 has a groove 241 extending throughout the overall length thereof, that is, it has a substantially U-shaped cross-sectional configuration. The fastener 204 is provided longitudinary with a projection 242 projecting into the groove 241 and extending throughout the overall length thereof. The fasteners 204 are positioned so that the projections 242 oppose to the wall portions 13a of the front pillars 13.

A molding body 202 is formed of resilient material such as rubber and synthetic resin and is configured so as to substantially conform to the configuration of the window shield 11.

The molding body 202 mainly comprises a leg portion 222 which is inserted into the clearance between the wall portions 12a, 13a and an edge surface 11a of the window shield 11, and a covering portion 221 which is integrally formed with the leg portion 222 and which is sized to sufficiently cover the clearance between the wall portion 12a, 13a and the edge surface 11a. The covering portion 221 includes an outer covering portion 221a to cover the edge portions of the roof panel 12 and the front pillars 13 and an inner covering portion 221b to cover the edge portion of the window shield 11.

The leg portion 222 is partly cut off to form cut off portions 126 (FIG. 10b) which are adapted to correspond to the fasteners 204 provided on the wall portions 13a when the molding body 222 is installed in the space between the wall portions 12a, 13a and the edge surface 11a of the window shield 11.

Figure 11A:
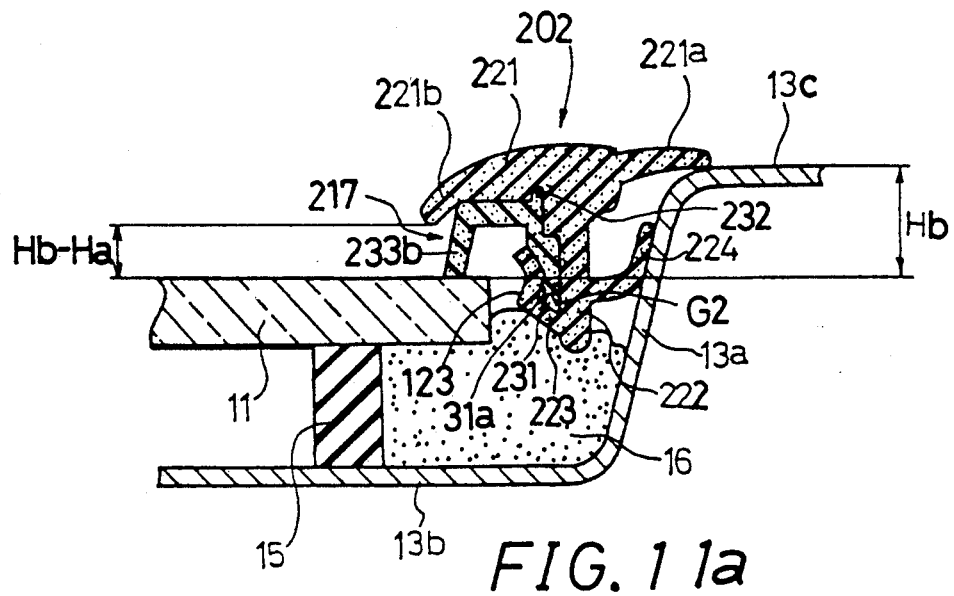
Figure 11B:
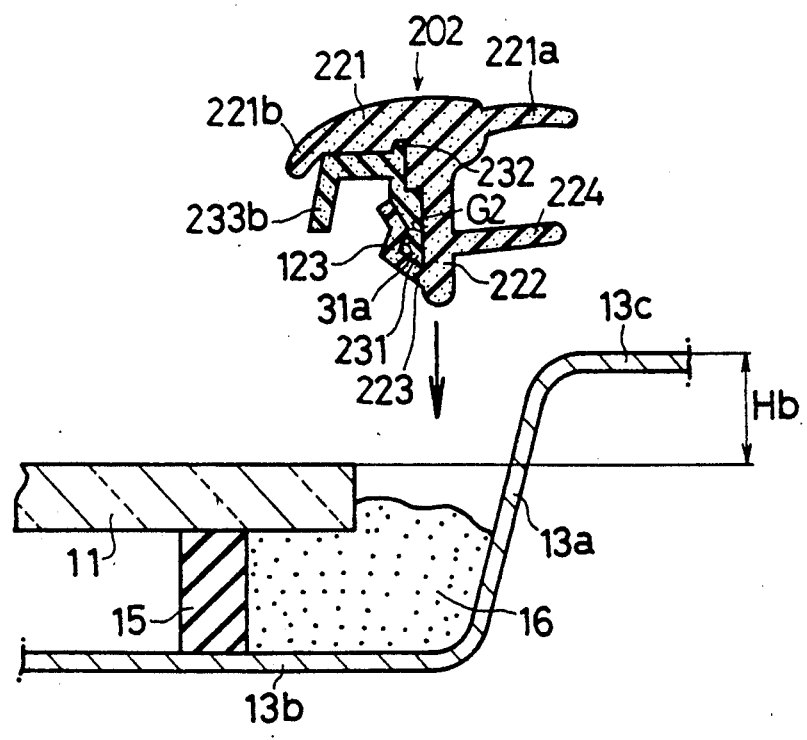
FIG. 11b is a view similar to FIG. 11a, before installing the molding body to which the complemental covering member is fitted.

The leg portion 222 is integrally provided with an outwardly extended resilient lip 224. The lower surface of the inner covering portion 221b is formed with an engagement groove 225 adjacent to the leg portion 222. The leg portion 222 is integrally provided with complemental lip 223 which is upwardly inclined to form a groove G2 between the complemental lip 223 and the inner surface of the leg portion 222. The groove G2 is best shown in FIGS. 11a and 11b. The complemental lip 223 is bent to form a shoulder portion 123.

The lower surface of the inner covering portion 221b is provided with complemental covering members 203 which are positioned only along the front pillars 13 and which extend substantially throughout the overall length of the front pillars 13.

As shown in FIGS. 9a, 9b, 9c, 11b, 12b and 13b, the complemental covering member 203 has a substantially channel shaped configuration and is formed of resilient material such as rubber and synthetic resin. The complemental covering member 203 includes a complemental covering portion 233, a longitudinally projected portion 232 which is engageable with the engagement groove 225, and a fitting portion 231 which is to be fitted into the groove G2. The complemental covering portion 233 is formed with an inclined surface 233a at one end portion opposite to the arcuate portion C between the roof panel 12 and the front pillar 13, thereby to be formed with a reduced height portion 233b having a triangular configuration. As will be appreciated, the length of the inclined surface 233a is substantially equal to that of the inclined portion 13c of the front pillar 13, and the inclination angle A2 of the inclined surface 233a is substantially identical with the inclination angle B of the inclined portion 13c. Further, the other portion of the complemental covering portion 233 will hereinafter be referred to as a full height portion 233c. The fitting portion 231 is formed with an engagement surface 31a which is engageable with the lower surface of the shoulder portion 123 formed on the complemental lip 223.

Figure 9A:
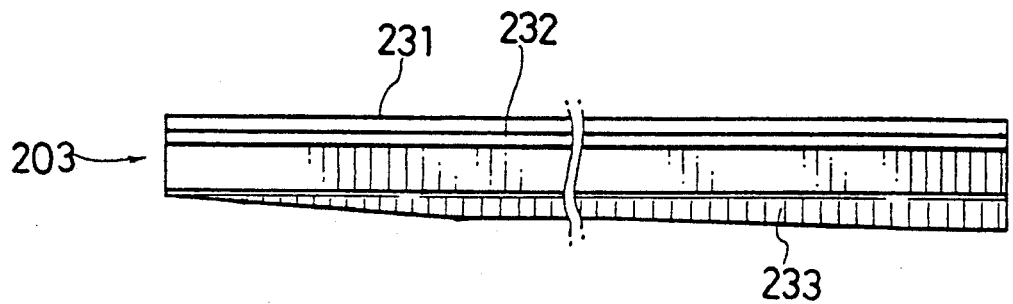
FIG. 9a is a plan view of the complemental covering member.
Figure 9B:
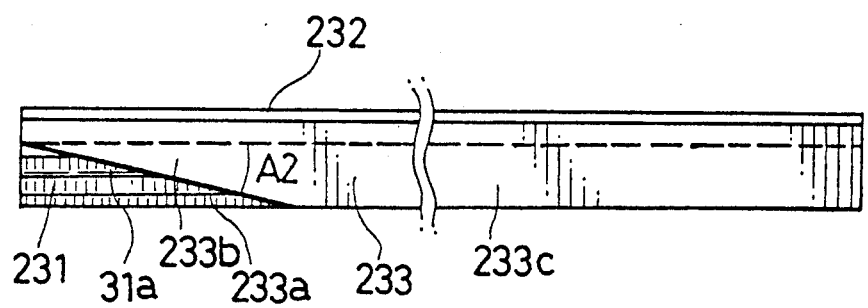
Figure 9C:
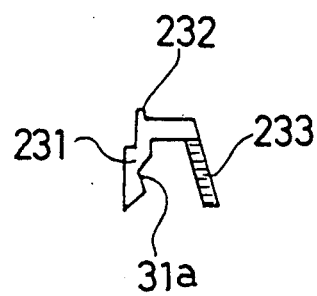
Figure 9D:
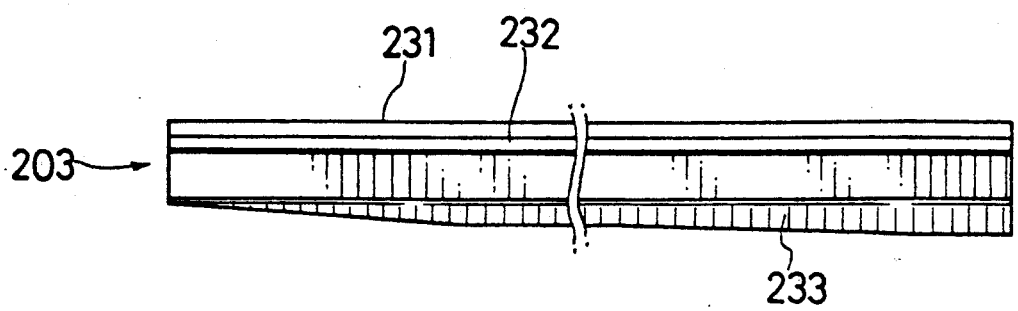
FIG. 9d is a plan view of a modified complemental covering member.
Figure 9E:
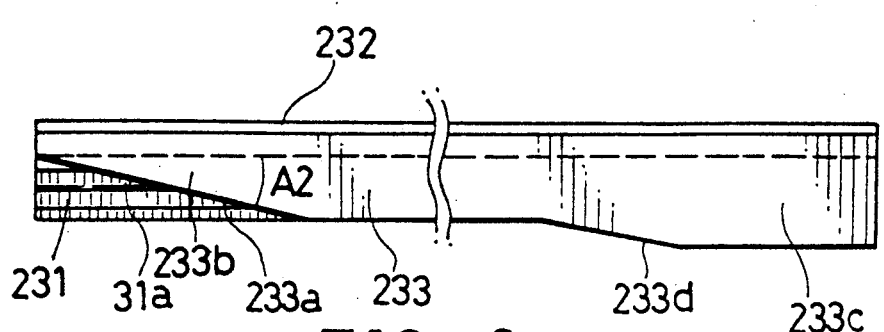
FIG. 9e is an elevational view of FIG. 9d.
Figure 9F:
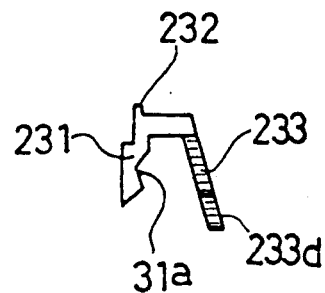
FIG. 9f is an end view of FIG. 9d.

As will be understood, the configuration of the reduced height portion 233b can be modified to conform to a modified configuration of the inclined portion 13c of the front pillar 13. Also, as shown in FIGS. 9d, 9e and 9f, a second inclined surface 233d can be formed on the complemental covering portion 233 when the front pillar 13 includes a second inclined portion (not shown).

As shown in FIG. 8b, the complemental covering member 203 as formed above is incorporated to the molding body 202 by fitting the fitting portion 231 and the projected portion 232 thereof into the groove G2 and the engagement groove 225 of the molding body 202, respectively. As will be appreciated, the complemental covering member 203 is positioned in such a way that the reduced height portion 233b of the complemental covering portion 233 corresponds to the inclined portion 13c of the front pillar 13.

As shown in FIG. 8a, the molding body 202 with the complemental covering member 203 is installed to the body 1 by inserting the leg portion 222 of the molding body 202 into the clearance between the edge surface 11a of the window shield 11 and the wall portion 12a of the roof panel 12.

Figure 10A:
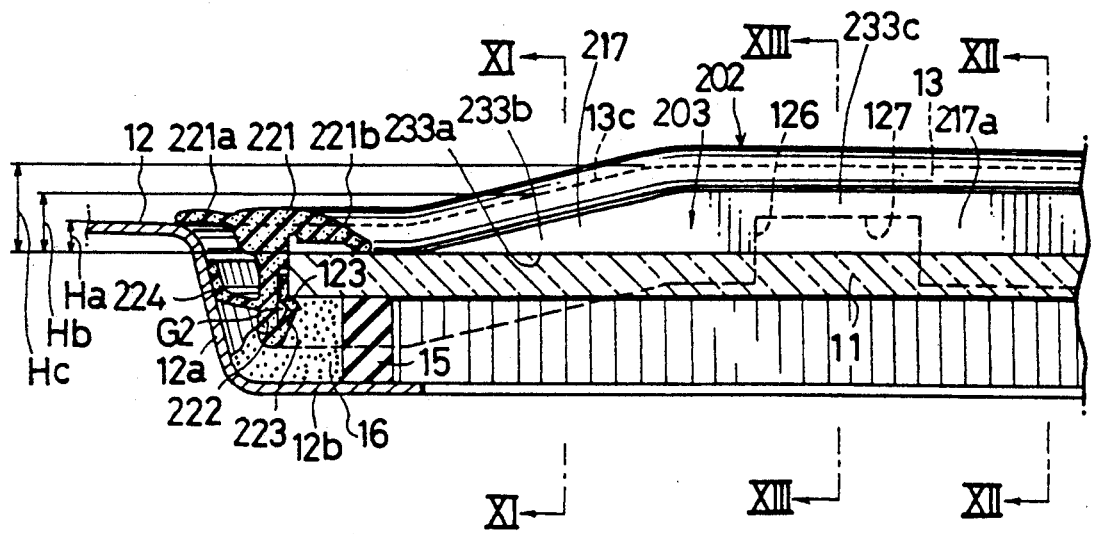
Figure 10B:
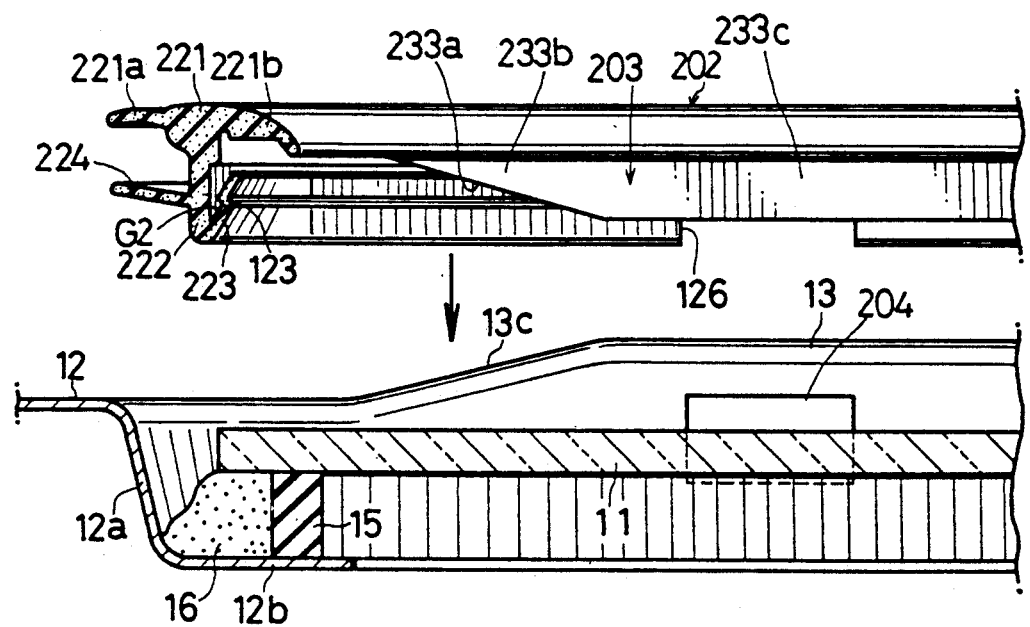
FIG. 10b is a view similar to FIG. 10a, before installing the molding body to which the complemental covering member is fitted.

As shown in FIGS. 10a and 10b, when the leg portion 222 is completely inserted into the space, at a portion of the molding body 202 adjacent to the roof panel 12, the outer covering portion 221a and the inner covering portion 221b are closely seated on the outside surface of the roof panel 12 and the outside surface of the window shield 11, respectively. The resilient lip 224 is pressed against the wall portion 12a. The shoulder portion 123 of the complemental lip 223 is engaged with the lower edge of the window shield 11. Also, the lower portion of the leg portion 222 is bonded to the flanged portion 12b with the adhesive 16.

As shown in FIGS. 11a and 11b, at a portion of the molding body 202 corresponding to the inclined portion 13c of the front pillar 13, the outer covering portion 221a is closely seated on the outside surface of the front pillar 13. The resilient lip 224 is pressed against the wall portion 13a. At this portion, since the gap height Hb between the outside surface of the window shield 11 and the outside surface of the front pillar 13 is greater than the gap height Ha between the outside surface of the window shield 11 and the outside surface of the roof panel 12, the inner covering portion 221b can not contact the outside surface of the window shield 11, thereby providing a clearance 217 having a width of Hb-Ha therebetween. However, since this portion of the molding body 202 is provided with the reduced height portion 233b of the complemental covering portion 233, the reduced height portion 233b is effectively flexed to be seated on the outside surface of the window shield 11. Also, the lower portion of the leg portion 222 is bonded to the flanged portion 13b with the adhesive 16.

As shown in FIGS. 12a to 13b, at a portion of the molding body 202 corresponding to the front pillar 13 except for the inclined portion 13c, the outer covering portion 221a is closely seated on the outside surface of the front pillar 13. At this portion, since the gap height Hc between the outside surface of the window shield 11 and the outside surface of the front pillar 13 is further greater than the gap height Ha between the outside surface of the window shield 11 and the outside surface of the roof panel 12, the inner covering portion 221b can not contact the outside surface of the window shield 11, thereby providing a clearance 217a having a width of Hc-Ha therebetween. However, since this portion is provided with a full height portion 233c of the complemental covering portion 233, the full height portion 233c is effectively seated on the outside surface of the window shield 11.

Figure 12A:
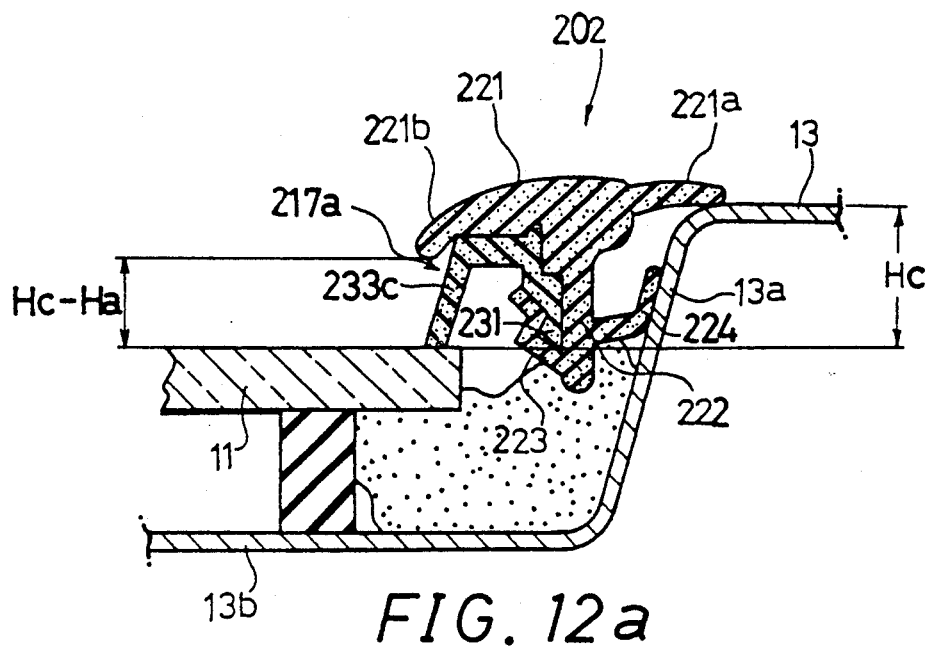
Figure 12B:
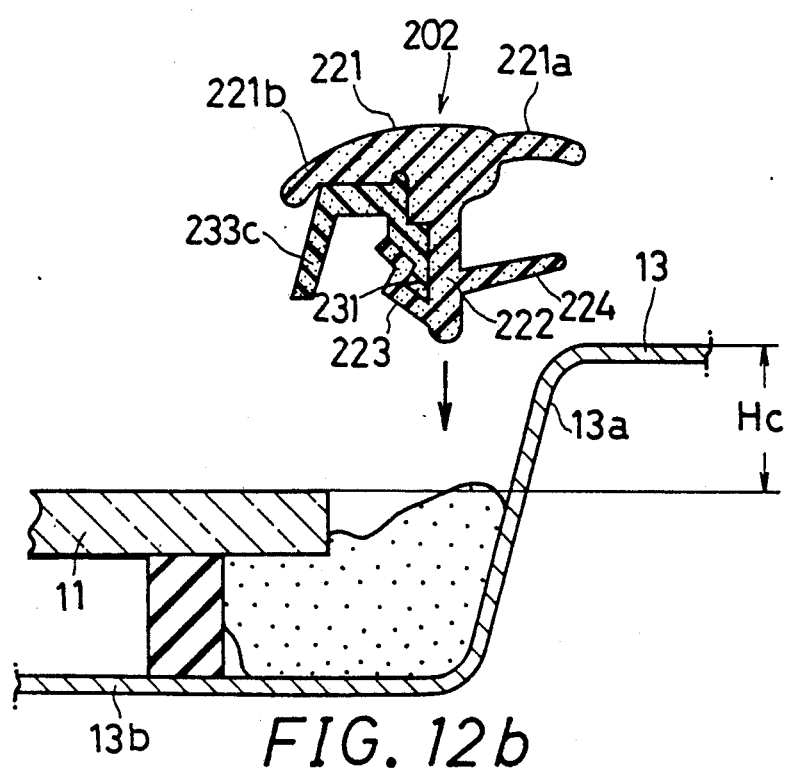
FIG. 12b is a view similar to FIG. 12a, before installing the molding body to which the complemental covering member is fitted.

As shown in FIGS. 12a and 12b, at a portion of the molding body 202 which does not correspond to the fastener 204, the resilient lip 224 is pressed against the wall portion 13a. Also, the lower portion of the leg portion 222 is bonded to the flanged portion 13b with the adhesive 16.

Figure 13A:
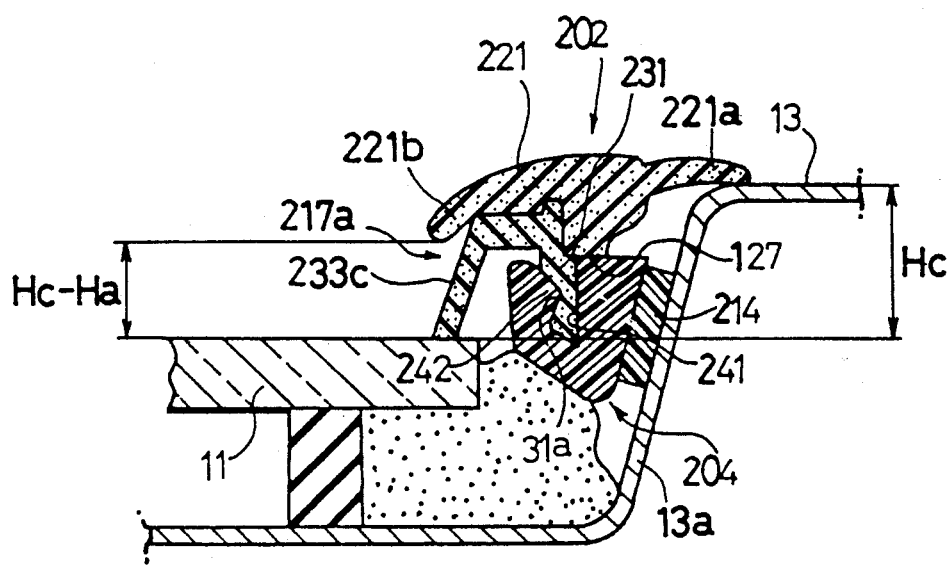
Figure 13B:
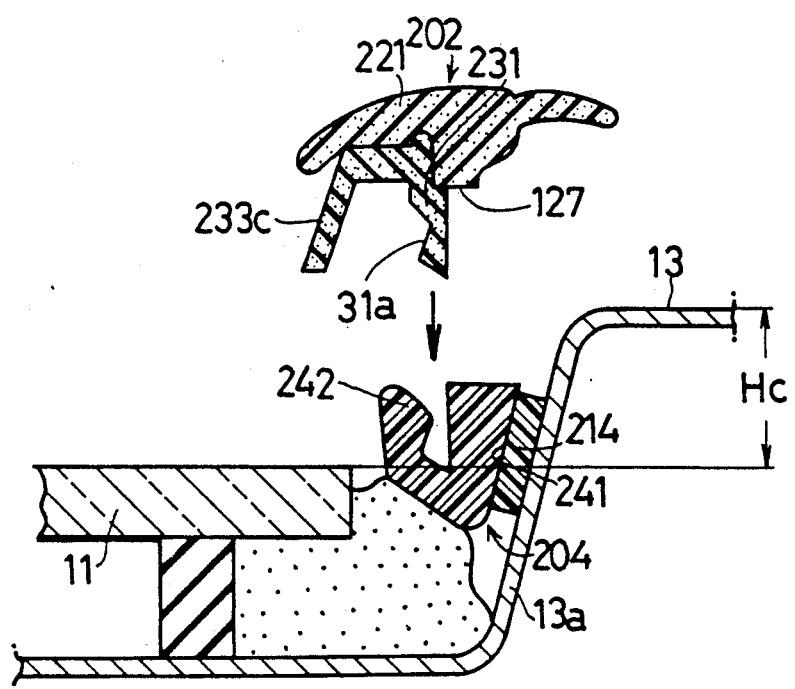
FIG. 13b is a view similar to FIG. 13a, before installing the molding body to which the complemental covering member is fitted.

As shown in FIGS. 13a and 13b, at a portion of the molding body 202 which corresponds to the fastener 204, the fitting portion 231 of the covering member 203 is inserted into the groove 241 of the fastener 204 because the leg portion 222 is provided with the cut off portion 126. At this time, the upper surface 127 of the cut off portion 126 is contacted to the upper surface of the fastener 204 and the engagement surface 31a of the fitting portion 231 is engaged with the projection 242 of the fastener 204. Thus the molding body 202 with the complemental covering member 203 is fixedly supported on the body 1.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A molding unit for use on a window shield mounted on the body of an automobile, comprising:
   a longitudinal molding body having a leg portion, a lip portion which is provided on a side surface of said leg portion to form a groove between said leg portion and said lip portion, and a covering portion provided on an upper portion of said leg portion;
   a complemental covering member positioned longitudinally along said molding body, said complemental covering member having a complemental covering portion and having a fitting portion which is to be fitted to said groove between said leg portion and said lip portion; and
   a plurality of fasteners provided on the automobile body for fastening said molding body with said covering member to the automobile body,
   wherein an outside surface of the window shield is seated by said covering portion of said molding body at one portion thereof and is seated by said complemental covering portion of said complemental covering member at the other portion thereof when said molding body with said covering member is positioned along the window shield.

2. The molding unit as defined in claim 1, wherein said complemental covering member is positioned along a portion of said molding body corresponding to a pillar of the automobile body.

3. The molding unit as defined in claim 2, wherein said complemental covering portion of said complemental covering member is formed with an inclined portion at one end thereof.

4. The molding unit as defined in claim 3, wherein said molding body, said complemental covering member and said fasteners are formed of rubber.

5. The molding unit as defined in claim 3, wherein said molding body, said complemental covering member and said fasteners are formed of synthetic resin.

6. The molding unit as defined in claim 4 or 5, wherein said fastener has an engagement groove, and wherein said fitting portion of said complemental covering member is cut off at one portion thereof corresponding to said fastener so that said leg portion and said lip portion of said molding body are inserted into said engagement groove of said fastener when said molding body with said covering member is positioned along the window shield.

7. The molding unit as defined in claim 6, wherein said fastener is provided with a projection projecting into said engagement groove, and wherein said lip portion is formed with a shoulder portion, said shoulder portion being engaged with said projection when said leg portion and said lip portion of said molding body are inserted into said engagement groove of said fastener.

8. The molding unit as defined in claim 4 or 5, wherein said fastener has an engagement groove, and wherein said leg portion of said molding body is cut off at one portion thereof corresponding to said fastener so that said fitting portion of said complemental covering member is inserted into said engagement groove of said fastener when said molding body with said covering member is positioned along the window shield.

9. The molding unit as defined in claim 8, wherein said fastener is provided with a projection projecting into said engagement groove, and wherein said fitting portion is formed with an engagement surface, said engagement surface being engaged with said projection when said fitting portion of said complemental covering member are inserted into said engagement groove of said fastener.

10. The molding unit as defined in claim 1, wherein said leg portion of said molding body is provided with a resilient lip which is adapted to biasingly contact to the automobile body.

* * * * *